May 7, 1935.   J. W. HANSEN   2,000,327
CLOCK
Filed March 14, 1929   7 Sheets-Sheet 1

INVENTOR
JULIUS W. HANSEN,
BY Toulmin & Toulmin
Attorneys

May 7, 1935.  J. W. HANSEN  2,000,327
CLOCK
Filed March 14, 1929   7 Sheets-Sheet 2

Inventor
JULIUS W. HANSEN,
BY Toulmin & Toulmin
Attorneys

May 7, 1935.  J. W. HANSEN  2,000,327
CLOCK
Filed March 14, 1929   7 Sheets-Sheet 3

Inventor
JULIUS W. HANSEN
By Toulmin & Toulmin
Attorneys

May 7, 1935.  J. W. HANSEN  2,000,327
CLOCK
Filed March 14, 1929   7 Sheets-Sheet 4
Fig. 12.
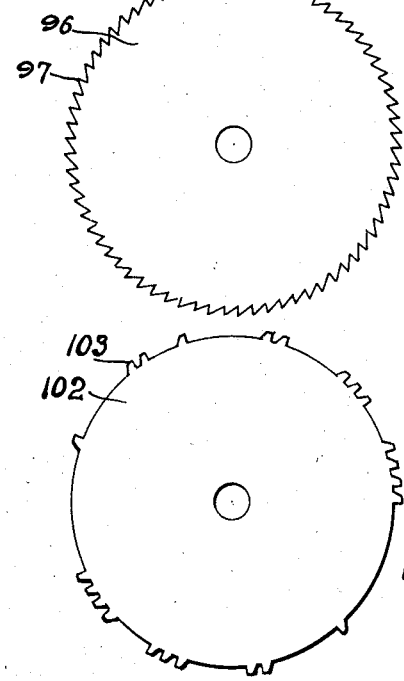
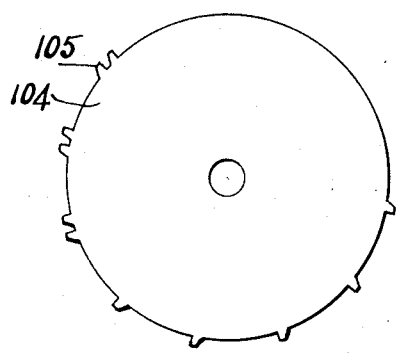
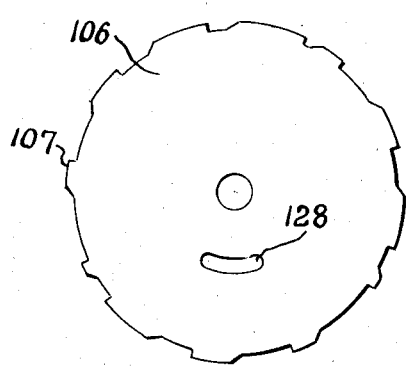
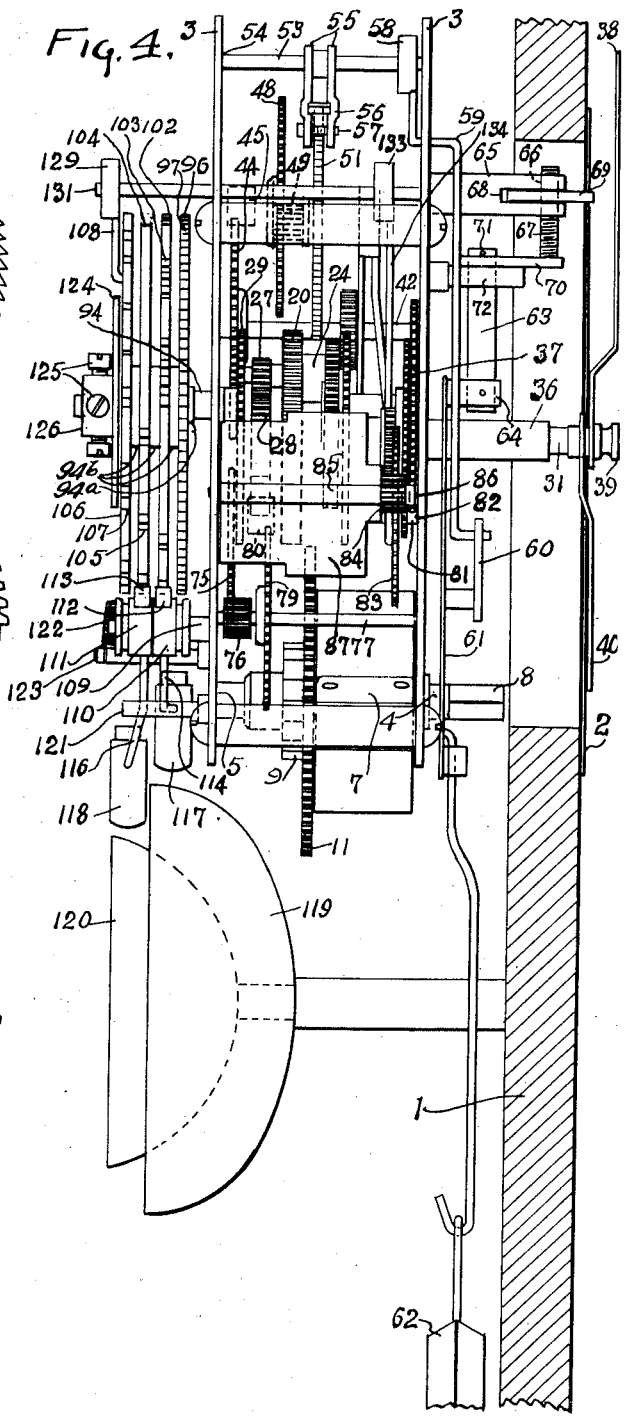
Fig. 4.
Inventor
JULIUS W. HANSEN,
By Toulmin & Toulmin
Attorneys

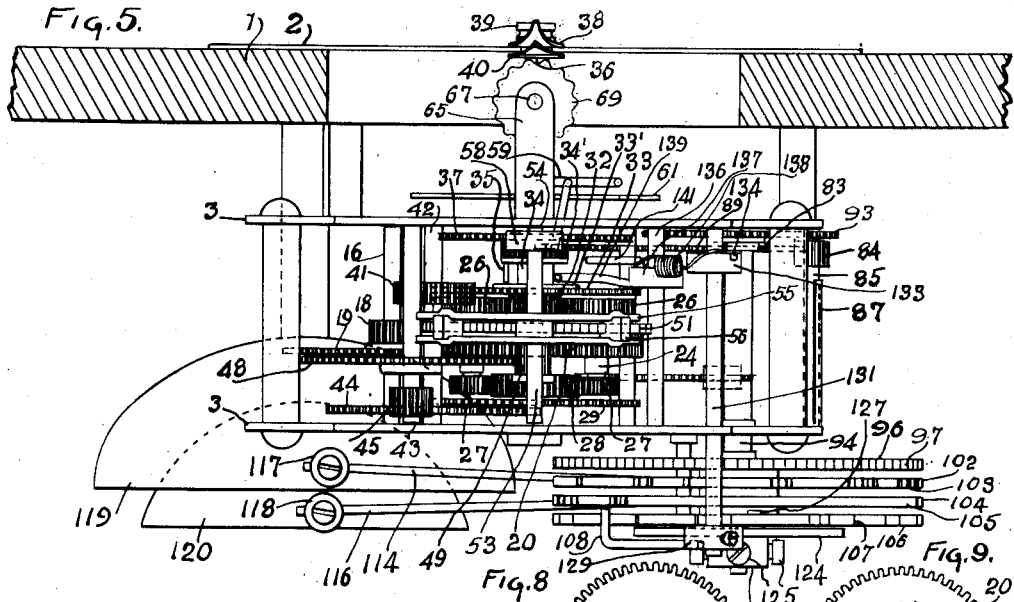

May 7, 1935.  J. W. HANSEN  2,000,327
CLOCK
Filed March 14, 1929   7 Sheets-Sheet 6

Julius W. Hansen, Inventor
By Toulmin & Toulmin
Attorneys

May 7, 1935.  J. W. HANSEN  2,000,327
CLOCK
Filed March 14, 1929  7 Sheets-Sheet 7
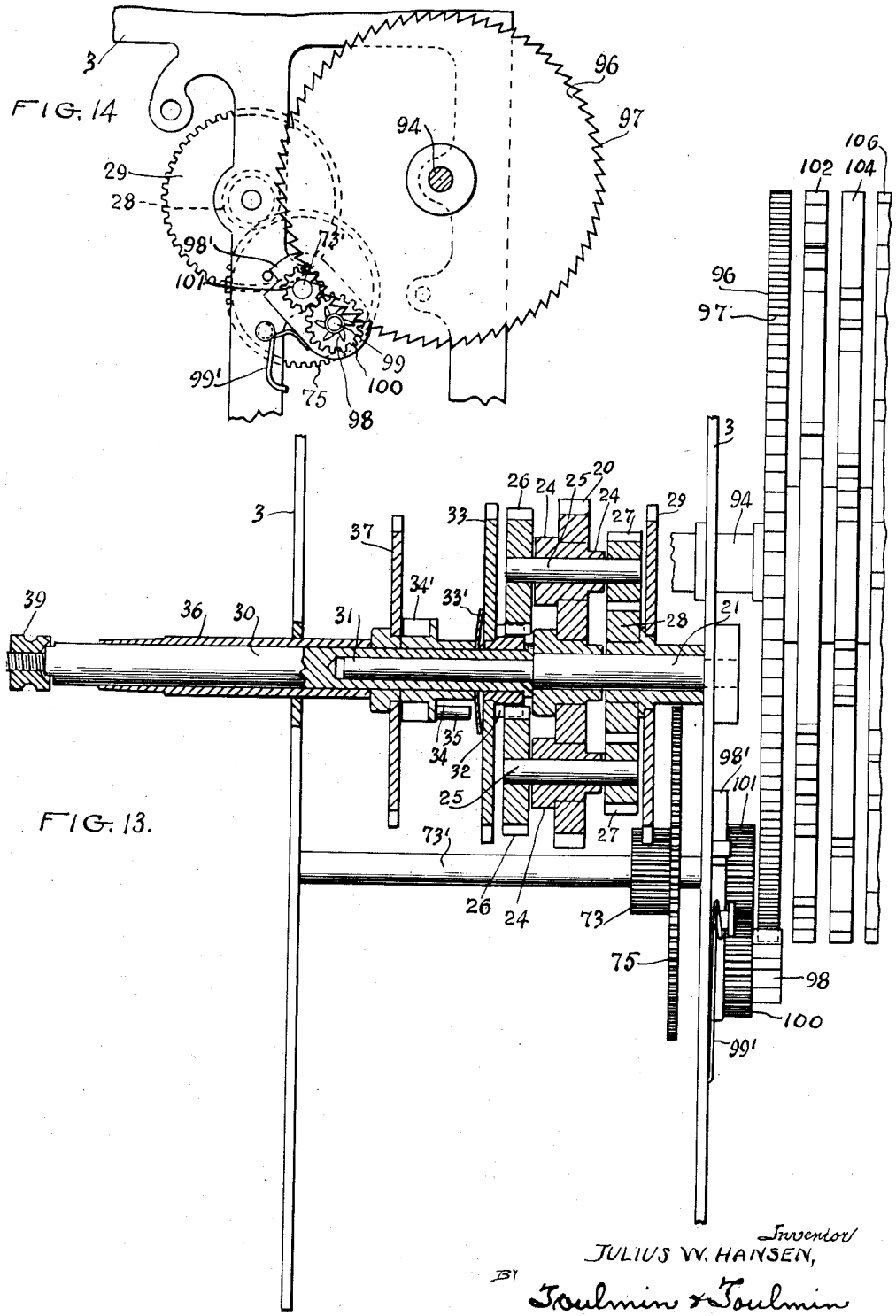
Inventor
JULIUS W. HANSEN,
By Toulmin & Toulmin
Attorneys Patented May 7, 1935

2,000,327

UNITED STATES PATENT OFFICE 2,000,327

CLOCK

Julius W. Hansen, Princeton, Ind.

Application March 14, 1929, Serial No. 347,041

8 Claims. (Cl. 58—13)

The object of this invention is to provide a new and improved clock, one in which the parts are reduced to a minimum in number, and in which the relative arrangement thereof is simple.

It is a further object of this invention to provide a clock in which there is a striking system composed of two bells, each used in its own particular way to count the strikes and operated from the same general mechanism.

It is a further object of this invention to provide a gear mechanism which enables the clock to be driven by one spring, this spring acting to drive both the time train and the strike train.

It is also an object of this invention to provide a device of this kind, in which the mechanism is driven by a single means, which may be some suitable electrical connection, in which only one motor would be required and one set of winding gears.

These, and other advantages, will be apparent from the drawings and the description taken in connection therewith.

In the drawings is shown a preferred embodiment of applicant's device, but is used merely by way of illustration.

In the drawings:

Figure 4 is a similar view to Figure 3, except it is from the lefthand of Figure 1.

Figure 5 is a top plan view showing particularly the strike mechanism and the strike operating mechanism.

Figure 6 is a longitudinal sectional view through the differential mechanism, showing the shaft and sleeve that carry the two hands.

Figure 7 is an end view of the sleeve for supporting and operating the hour hand together with the gear on one end thereof.

Figure 7a is a view taken at right angles to Figure 7.

Figure 8 is an end view of the minute hand supporting and operating spindle with a gear and pinion on one end.

Figure 8a is a view at right angles to Figure 8.

Figure 8b is a view showing the minute hand spindle at the end opposite to that shown in Figure 8.

Figure 8c is a side elevation of the strike gear for intermittently operating the strike mechanism.

Figure 8d is a top plan view of the gear shown in Figure 8c.

Figure 9 is a view showing one end of the differential gear mechanism.

Figure 9a is a view showing the opposite end of the differential gear mechanism from that shown in Figure 9.

Figure 9b is a plan view of the differential gear mechanism.

Figure 12 is a view showing the disc, the dong bell actuator, the ding bell actuator and the counterwheel removed from their support shaft 94.

Figure 13 is a vertical, longitudinal section through the differential gear mechanism showing parts of the adjacent mechanism operated thereby. Figure 14 is a fragmentary view showing the mechanism by which the striking discs are operated at an increased speed.

Like reference characters are used to designate similar parts on the drawings and throughout the specification.

Figure 1:
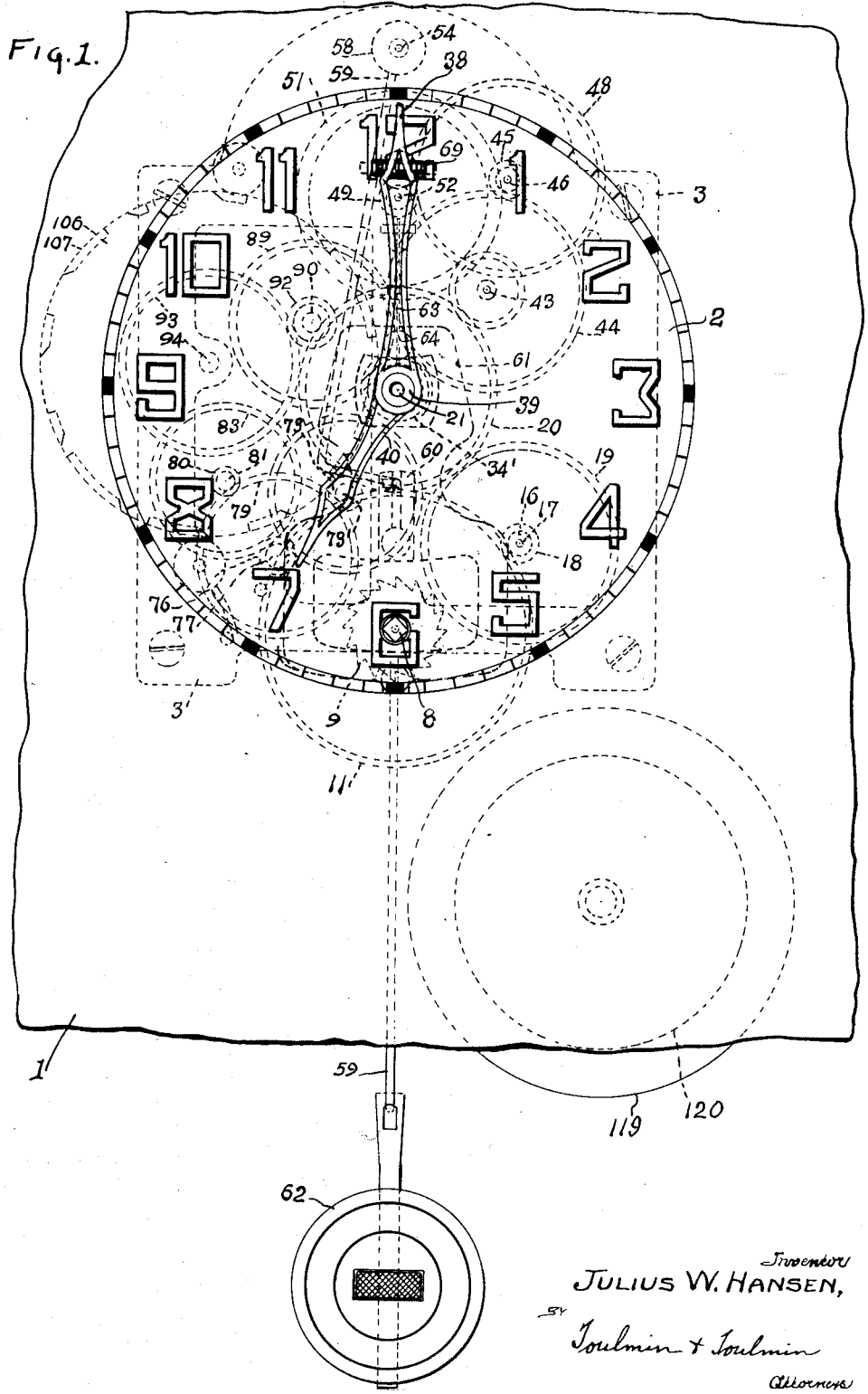
Figure 1 is a front view of the clock showing the dial and the mechanism of the clock in dotted lines.

The wooden frame support for the clock is indicated by the numeral 1. This may be used to designate the outer casing of the clock or any immediate frame that supports the framework of the clock itself.

The numeral 2 is used to designate the dial which is in an ordinary form, such as is usually found in clocks of this general type. The working parts of this clock are supported by a brass framework, which as a whole is indicated by the numeral 3.

The main shaft 4 is pivotally mounted at 5, to the framework 3 of the mechanism. This shaft 4 is driven by a spring 6, which is coiled around shaft 4 and suitably attached thereto at one end, and at the other end it is fixed by a support 7, to some suitable part of the brass framework 3.

The end of this shaft that projects through the dial is squared at 8, for the reception of the usual key for winding purposes. On the other end of this shaft 4 is attached a ratchet wheel 9 through which the spring operates the gear 11 of the clock and causes it to run.

This ratchet wheel is held in relation to the main driving gear by means of a pawl 10, which engages the ratchet wheel 9. The main gear 11 has the pawl 10 pivoted thereon at a point 12. This pawl 10 holds the shaft 4 against turning when the clock is wound, and because of its attachment to the main drive gear, causes said gear to turn with the spring and operate the time gear train of the clock.

For the purpose of holding the pawl in engagement with the ratchet wheel there is provided a spring 13, fastened to the main driving gear 11 at the point 14 and to the pawl at the point 15.

Adjacent the main drive gear there is pivotally mounted a shaft 16, which is pivoted to the metal frame 3 at points 17. On this shaft 16 is a small pinion, 18, which meshes with the main gear 11 by which it is driven.

Also, on this same shaft 16 is a gear 19, which meshes with a differential gear, of the differential gear mechanism 20, particularly shown in Figure 6, and in detail in Figures 7, 8, 9 and 9a.

The main spindle of this differential mechanism is indicated by the numeral 21 and is journalled at 23 in the frame 3 at its reduced end 22.

The differential gear 20 is rigidly attached to the spindle 21, and has on each side of the spindle bearings 24. In each of these bearings 24 is a short spindle 25, which has on each end thereof a small pinion rigid therewith, which holds the parts assembled to the gear 20.

The pinion on one end of each of the spindles 25 is indicated by the numeral 26, while that at the other end is smaller and is indicated by the numeral 27.

Pivotally mounted on spindle 21 and in mesh with pinions 27 is a pinion 28, which has rigidly attached thereto a gear 29. This pinion 28 and gear 29 are loosely mounted upon the spindle 21 and adapted to be rotated by means of the small pinion 27 when the main differential gear 20 is rotated. This gear 29 may also remain stationary and not interfere with the proper movement of the other part of the running gear of the clock. It is through this gear 29 that the striking operation is controlled. The gear 29 operates the strike operating mechanism and when the strike operating mechanism is not operated it is stationary, and when stationary the rotation of the gear 20 causes the pinion 26 to rotate and drive the pinion 32.

On the other end of the spindle 21, designated by the numeral 31, is a hollow spindle 30, rotatably mounted. On the inner end of this hollow spindle is frictionally mounted the pinion 32, which is adapted to engage the pinions 26 carried by the main drive gear 20. Associated with the pinion 32 is a gear 33 just on the outside thereof, rigidly attached thereto. Each of these parts, the pinion 32 and the gear 33, is frictionally engaged with the hollow spindle 30 and a collar on the inner end thereof by means of a sleeve 34 rigid with said hollow spindle and a spring member 33'.

On this sleeve 34 and fixed thereto is a pinion 34' which operates the gear train that operates and controls the strike operating mechanism. Gear 33 operates the escapement mechanism for the pendulum.

Projecting from the pinion 34' and across the space between that pinion and the gear 33 is a pin 35, which will be described later on as to its function. Fitting over the outer end of the hollow spindle 30, remote from the mechanism just described, is a sleeve 36, which is rotatably mounted on the hollow spindle 30 and has on its inner end a fixed gear 37, which bears close against the pinion 34'.

On the outer end of the spindle 30 the minute hand 38 is attached by means of a nut, 39. This hand is operated through the pinion 32 because of the frictional engagement between that gear and the hollow spindle 30. This frictional engagement permits the free movement of the hand for setting purposes, yet the friction is sufficient that under normal conditions the hand will be driven thereby.

On the outer end of sleeve 36 the hour hand 40 of the clock is attached, and is driven by means of gear 37, which is driven by mechanism hereinafter described.

Meshing with the gear 33 is a pinion, 41, which is carried rigidly with the shaft 42 and pivoted at points indicated by the numeral 43 in the frame 3.

On the inner end of this shaft 42 there is a gear 44, which meshes with a pinion 45 on a shaft 46, suitably supported and pivoted in the frame at points 47. 48 is a gear mounted on the shaft 46 and meshes with a pinion 49 carried by a shaft 50, and rigid therewith. This shaft 50, pivoted at 52, carries a ratchet 51 which acts as an escapement, together with certain mechanism hereafter described.

There is an escapement shaft 53 supported in the frame 3 at points indicated by the numeral 54.

Extending from the escapement shaft are two arms 55, which have suitably attached thereto pallets, 56. In the present instance these pallets are attached to the arms by means of screws 57, which hold the pallets in fixed relation to the escapement arms. On the outer end of the escapement shaft 53 there is a lug, 58, to which is attached the upper part of the pedulum arm 59, which is at its lower end bent and formed to engage a bracket member 60, formed in the upper part of the pendulum frame.

The pendulum rod frame as a whole is indicated by the numeral 61, and carries on the lower end thereof the pendulum ball 62. The upper part of the pendulum is provided with a spring support, 63, which is attached to the pendulum frame, as indicated by 64.

Extending from the upper part of the frame 3 there is a bracket arm, 65, which has a hole 66 therein, for the reception of a bolt 67. This bracket 65 has also a slot 68 through the end thereof, perpendicular to the hole and is adapted to receive an adjusting nut, 69, which engages the bolt passing through the hole, the bolt being screwthreaded to engage the adjusting nut.

Extending from the lower end of the screw 67 is a bar, 70, which is suitably attached to the spring 63, as indicated by the numeral 71.

There is also, immediately beneath the bracket 65, a smaller bracket 72, which has a slot therein to receive the upper end of the pendulum suspending spring 63. In fact, the pendulum oscillates from this point 72 while it is suspended from the bracket 65, but the point of oscillation is about the lower part of the bracket 72. The length of the pendulum may be varied by means of nut and bolt mechanism, usually found in connection with the pendulum ball.

The foregoing description has explained the gear train that controls the operation of the hands, and the escapement mechanism. The following is a description of the gear train used in connection with the striking features, together with that for operating the hour hand. The gear 29 meshes with a pinion 73, which is rigidly mounted on the shaft 73' pivoted at points 74 to the frame 3.

There is also mounted on the shaft 73' a gear 75, which meshes with a pinion 76 on shaft 77. On the shaft 73' and without and back of the frame 3 is a pinion 101 for driving the striking mechanism. On the shaft 77, which is pivoted at point 78 in the frame 3, is a gear mechanism 79, which meshes with a pinion 80 on a shaft 81, which is pivoted at 82 in the frame 3. Also upon the shaft 81 is a gear 83, which meshes with the pinion 84 on shaft 85 pivoted at 86 to the frame 3. 87 indicates a fan-like structure, which is mounted upon the shaft 85 and tends to act to retard or check the movement of the parts and prevent too rapid movement.

There is also on the inside edge of the gear 83 a pin 88 projecting therefrom and serving, in connection with a spring or wire member later described, to hold the striking train from operation until certain release actions take place.

Meshing with the pinion 84' is a gear 89 mounted upon the shaft 90, which is pivoted at 91 in the frame 3. On the shaft 90 there is also a pinion 92, which meshes with the gear 93 and the gear 87. The gear 87 is on the sleeve 96 and operates the hour hand, the gear 93 being mounted upon the shaft 94, which is pivoted at 95 in the frame 3.

Strike operating mechanism

Loosely mounted on the inside end of the shaft 94 without the frame there is a disc 96, having teeth 97. This disc fits against a shoulder 94a on the shaft 94. While this disc is normally intended to rotate with the shaft 94 it may be rotated independently thereof, and does at certain times or stages in the operation.

On the outer end of shaft 73' is pivoted one end of an arm 98', which has on its other end a stub shaft 99 on which are two integral pinions, one 98 having teeth adapted to engage with the teeth 97 of the disc 96 and the other 100, which has teeth engaging the teeth of a pinion 101 located on the end of the shaft 73' outside of the arm 98'. The teeth of the pinion 98 are held in engagement with the teeth of the disc 96 by means of a spring 98'.

The teeth of the pinion 98 are so shaped that the rotation of the disc 96 anti-clockwise will not be impeded thereby when the pinion is not rotating, and because of the pivotal nature of the arm 98' and the spring 98' the disc may be rotated readily without the pinion interfering with the rotation. However, when the pinion 98 rotates, by means of the shaft 73', the teeth thereof will engage the teeth 97 by which the disc 96 is temporarily rotated. The shaft 73' is rotated by means of the gear 29 and the pinion 72.

Without the disc 96 and loosely mounted upon the shaft 94 is a dong bell actuator 102, which is circular and has on its outer periphery dong bell teeth 103. Just outside of the dong bell actuator 102 and loosely mounted on this same shaft 94 is a ding bell actuator 104, which is of the same shape and size as the dong bell actuator, and has on its outer periphery teeth 105.

Without each of these actuators and loosely mounted on the end of the shaft 94 is a count wheel 106, which is circular in shape but has on the outer periphery thereof certain projections 107, which are adapted to engage an arm 108.

Striking mechanism

Extending from the frame 3, just beneath the dingdong apparatus, is a pin or shaft 109, on the inside of which near the frame 3, is a disc 110 and an outer disc 111. Extending from disc 110 is a lip 112 adapted to engage the projections on the dong bell actuator. On the outside disc 111 there is a lip 113 similar to 112, adapted to engage the lips 105 on the outside of the ding bell actuator.

Extending from disc 110 is a wire 114, bent at 115 to extend in a substantially horizontal direction. There is extending from the disc 111 a second wire 16, bent at 115 and extending in the same direction as the other wire. On the outer end of the wire 114 is a dong clapper 117, while on the outer end of the wire 116 is a ding clapper 118. The numeral 119 indicates the dong bell to be struck by the dong clapper 117, while 120 indicates the ding bell to be struck by the ding clapper 118.

The numeral 121 indicates a stop pin which engages each of these wires that support the clapper at a point near the bends 115, and merely holds the clappers out of engagement with the bells to permit the clapper to strike the bell due to the resilient action of the wires.

To each of discs 110 and 111 is attached one end of a spring 122, which has its other end attached to a pin 123. These springs tend to hold the lips on the discs in engagement with the projections on the actuators.

On the extreme outer end of shaft 94 is a disc 124 which is held to the shaft by means of screws 125, which pass through a sleeve 126 on the outer face of the disc. The disc 124 cooperates with the shoulder 94a in holding the disc 96, the bell actuators and the count wheel on the shaft 94 and in frictional engagement with one another by means of interposed discs or hubs 94b. On one face of this disc 124 is a pin 127 which projects into a slot 128 in the count wheel 106. This slot is sufficient to allow a certain amount of play or movement of the counter-disc about the shaft 94, but is limited in its play by the pin 127 engaging the ends of the slot. This slot is arcuate in shape so as to permit the pin as the disc rotates to freely move therein. This disc 124 also serves to hold each of the discs in frictional engagement on the outer end of the shaft 94 in their proper relation to each other for the purpose of operating the bells. The friction of the parts between the disc 96 and the disc 124 is such that these parts rotate with the shaft 94 only when the pin 127 engages one end of the slot 128.

The teeth on the outer surfaces of the actuator may be arranged in such a way that the bells will strike in such order as may be desired. They may be made to strike alternately or together, or one any number of times, in combination with the other one a certain number of times.

The arm 108 which engages the outer periphery of the count wheel is mounted on a disc 129 located on the outer end of a shaft 131 and fastened thereon by means of a screw 130. This shaft 131 is suitably mounted upon the framework 3 and has on the other end thereof from the disc 129 a second disc 133.

Securely attached to the disc 133 and extending downwardly therefrom is a lever 134 composed of wire or any other suitable material, with a hook 135 on the end thereof, which engages the pin 88 on the gear 83, and holds the gear 83 against movement until such time as the hook 135 is released from the pin 88. The hook is released from the pin by the action of the projections 107 on the count wheel 106 engaging the arm 108, which is attached to disc 129 on the other end of the shaft carrying these discs.

Located adjacent the shaft 131 is shaft 136, which has mounted thereon a disc 137, to which is secured lever members 139 and 141. These levers are formed integral with each other, and are securely fastened to the disc 137 and move therewith.

The lower end of lever 139 is formed into a hook 140 adapted to be engaged by the pin 35 on the pinion 34'. This pinion 34' makes a rotation in each hour, and at the end of each hour the pin 35 engages the hook 140.

The upper part of the disc 137 is connected to the upper part of disc 133 by means of a spring 138. This spring tends to hold the lever 134 away from each of the levers 139 and 141. The lever 141, which is integral with lever 139 and substantially parallel therewith for some distance, bends toward the lever 134 and has on the end thereof a hook formation 142 adapted to also engage the pin 88.

This lever 141 and the hook 142 are operated and actuated by means of the lever 139 being engaged by the pin 35. When the pin 35 engages the hook part 140, the hook part 142 is forced toward the gear 83 and in the path of the pin 88, and is engaged by that pin to prevent the rotation of the gear 83 until released from that pin, which takes place when the pin 35 passes beyond the end of the hook 140.

The spring 138 tends at all times to hold the hook member 142 away from the pin 88, while it tends to hold the hook 135 in the path of and in engagement with pin 88.

Figure 10:
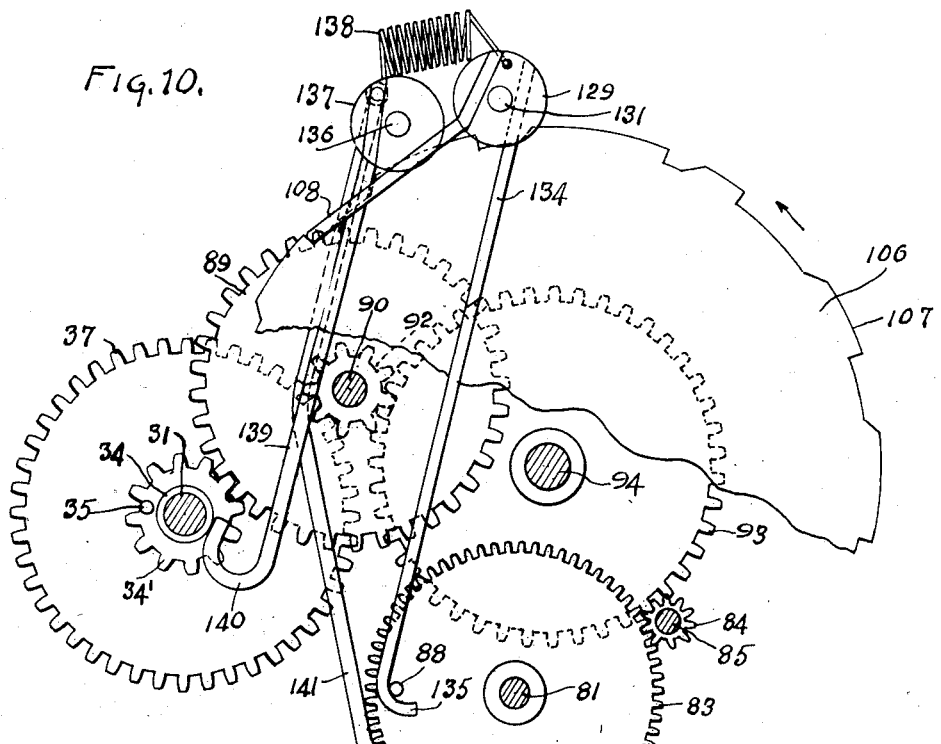
Figure 10 is a view of the chain of gear that operates and controls the strike operating mechanism.
Figure 11:
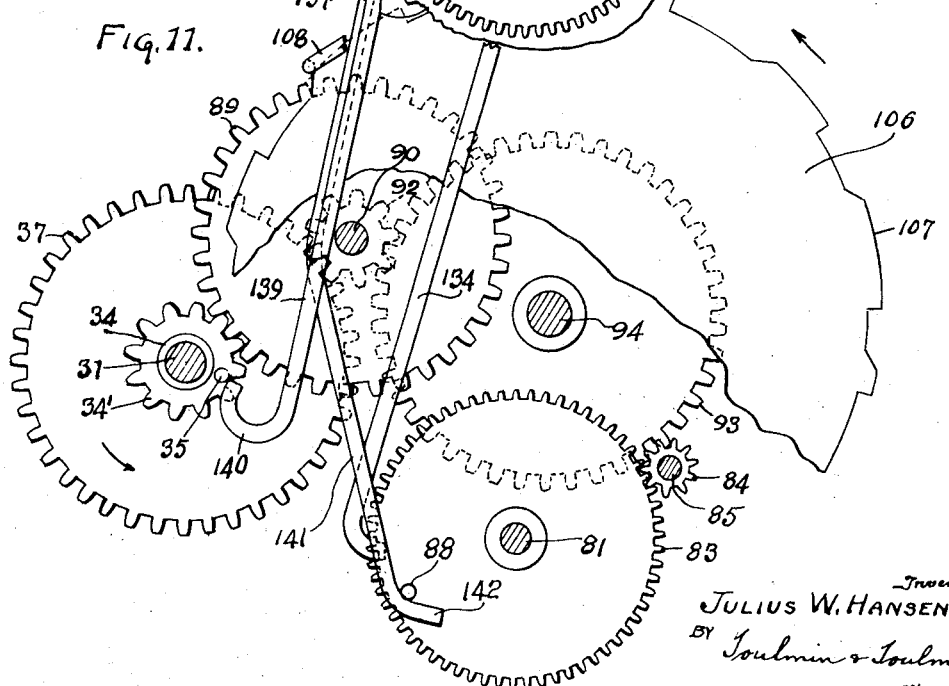
Figure 11 shows the same mechanism as Figure 10 but with the parts in another position.

The operation of the parts here described and fully shown in Figures 10 and 11 is as follows:

The pinion 34' is fastened to the spindle 30, which carries the minute hand and makes one revolution per hour. Hence, the pin 35, which is fastened to the pinion 34', also makes one revolution per hour.

The purpose of this pin is solely to release each hour the gears that operate the strike operating mechanism, and this is accomplished in the following manner: The pinion 34' gears with the pinion or change wheel 89, which is carried on shaft 90. This shaft carries a pinion 92, which meshes with the gear 37, which carries the hour hand. This pinion 92 also meshes with the gear 93 fixed on the shaft 94. The shaft 94 carries the strike operating mechanism which is operated through the chain of gears here described.

It will be observed from the mechanism described here and shown in Figures 10 and 11, that the shaft 94 continuously rotates and at the same rate of speed as the hour hand; that is, it makes one rotation in twelve hours, while the pin 35 makes a rotation every hour.

As the spindle 30, with the pinion 34', revolves the pin 35 will lift the lever 139, thereby raising the lever 141 since these two have the same fulcrum and are rigid, or substantially so. This brings the hook on the end of the lever 141 within range of the pin 88. Now the pin 35 is raising the levers 139 and 141 and the count wheel 106 is turning in the direction of the arrow, and will raise the lever 108. By this action the lever 134 will move away from the pin 88 and consequently will release it. By this time the lever 141 is within the range of the pin 88 and consequently will drop against it.

We have now this situation. The pin 88 is now resting against the lever 141 at the hook point 142, while the lever 134 is out of range of the pin 88. The pin 35 continues to move until the lever 139 will drop off, which happens at the exact hour point. The pin 35 is now entirely released. The train of gears for operating the strike operating mechanism now is in operation and will continue to operate as long as the arm 108 engages one of the projections 107. As it drops off of one of the projections 107 the arm 134 moves toward the gear 83, and the pin 88 engages the hook 135 and locks the train of gears for operating the strike operating mechanism against movement for another hour.

Figure 2:
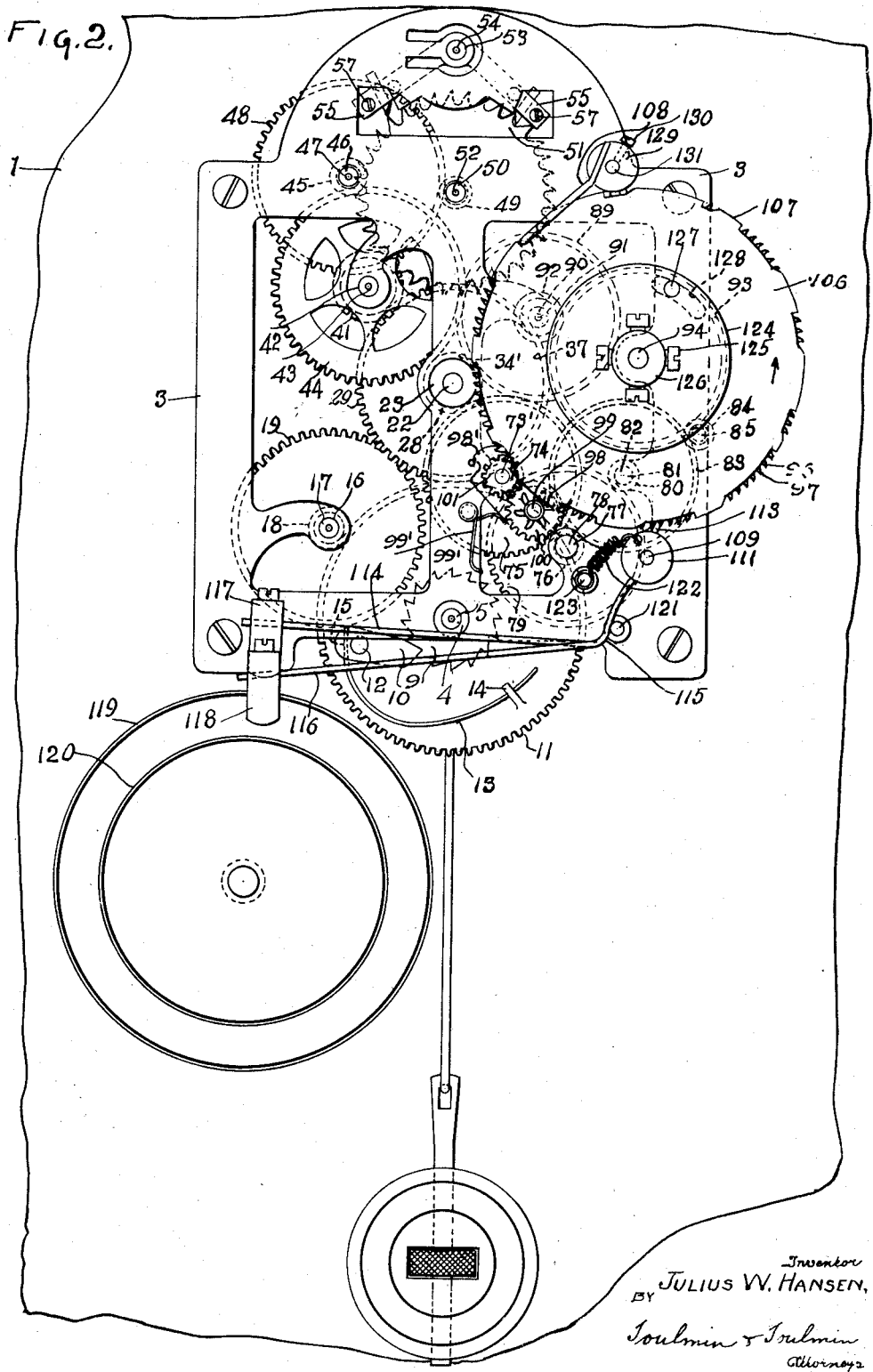
Figure 2 is a rear view of the clock showing the metallic frame for supporting the running parts, and the bells of the strike means.
Figure 3:
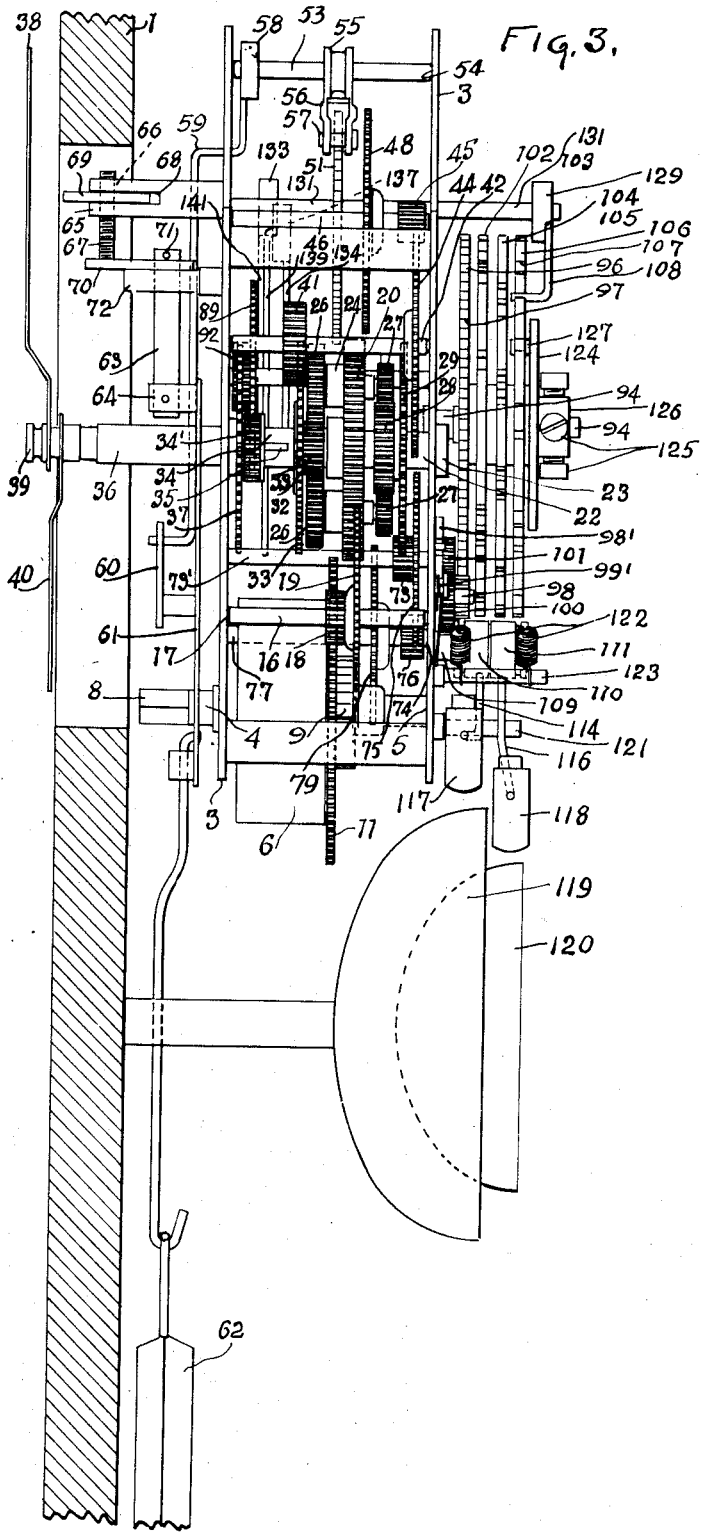
Figure 3 is a view showing a cross section of the supporting means, and a side view looking at the clock from the righthand of Figure 1.

When the striking train is released, as above described, the striking train will propel the discs 96, 104, 102 and 106 in the manner and direction indicated by the arrow shown on Figures 2, 10 and 11. This rotation is effected by the ratchet teeth 97, which are engaged by a ratchet wheel 98 operated by a train of gears in connection with the pinion on the end of shaft 73'. This shaft 73' is rotated intermittently and only when the striking mechanism is in operation.

The striking device, comprising four discs, is propelled at certain times by the strike train and at times by the time train of the clock through the dial train, that is, through the spindle 30. During the time that the strike mechanism is in motion these four discs are moved in the direction of the arrow by the ratchet wheel 98. After the strike ceases there is a period of rest, corresponding to the number of strokes that have been made. The shaft 94 is geared into the change wheel 89 through the gear wheel 93. And this shaft moves exactly in unison with the hour wheel and hand, which have one revolution in twelve hours. The disc 124 is fastened to this shaft by means of a collar and set screws 125. To this disc 124 is fastened a pin 127, which moves in the slot 128 of the count wheel 106.

Assuming that the time train has carried the four discs forward by means of the dial train through gear wheel 93 and the position of the pin 127 is in the slot 128 at one end thereof, now the strike mechanism is released and the four discs, including the count wheel, are carried forward in the direction of the arrow independent of disc 124. Let us assume that the clock struck three. Then the position of the pin would be in the slot 128, a little more than half-way from the starting point in the slot.

This space or length of the slot 128 is just sufficiently long to permit the rotation of the discs during five strikes. No more than five strikes are supposed to take place at any time. At the end of any number of strikes the shaft 94 rotates and the discs remain stationary until the pin 127 engages in the end of the slot 128 and carries the discs with it.

It is evident from the foregoing description that during the time of the ordinary running of the clock, between the strike periods, that the discs 96, 104, 102 and 106 rotate together at a uniform rate of speed necessary to produce one rotation in twelve hours, but that during the period of strike these discs or members rotate at a more rapid rate of speed, due to the rotation of the shaft 73' and the pinion 101 on the outer end thereof, which communicates motion to these discs at the time of striking.

The length of rapid rotation of the discs depends upon the number of strikes. For one strike the length of this rotation is small; for five strikes it is, of course, the largest rapid rotation, and at the end of five strikes the pin engages the extreme end of the slot in the count wheel.

During the interval immediately after striking the discs are stationary on the shaft 94 due to the ratchet wheel 98 resisting the rotation of the disc 96, and remain stationary until the disc on the outer end of this shaft reaches the point where the pin engages the end of the slot in the count disc, after which the discs can move with the shaft 94 due to the teeth 97 slipping by the teeth of the ratchet wheel.

It is preferred that the ding, or the five-stroke bell be sounded first, and that the dong, or one-stroke bell follow. It is, however, optional and the one strike could precede the five strikes.

The following is a schedule of the twelve-hour strokes:

| | | | |
|---|---|---|---|
| 1 o'clock | 1 dong | | |
| 2 Do. | 2 Do. | | |
| 3 Do. | 3 Do. | | |
| 4 Do. | 4 Do. | | |
| 5 Do. | 1 ding | | |
| 6 Do. | 1 Do. | 1 dong | |
| 7 Do. | 1 Do. | 2 Do. | |
| 8 Do. | 1 Do. | 3 Do. | |
| 9 Do. | 1 Do. | 4 Do. | |
| 10 Do. | 2 Do. | | |
| 11 Do. | 2 Do. | 1 Do. | |
| 12 Do. | 2 Do. | 2 Do. | |

I desire to comprehend within my invention such modifications as may be clearly embraced within my claims and the scope of my invention.

Having thus fully described my invention, what I claim is new and wish to protect by Letters Patent is embodied in the following claims:

1. In a clock mechanism, a source of power, a differential gear mechanism in operative relation with the source of power, said differential gear mechanism consisting of a main gear, an auxiliary gear adapted to operate a time indicating mechanism consisting of a visual time indicating means and part of a sound time indicating mechanism, a second auxiliary gear associated with the differential mechanism and adapted to intermittently operate another part of the sound time indicating mechanism, means for holding said second auxiliary gear against operation, and means for releasing said last-named means to permit the operation of the sound time indicating mechanism through the second auxiliary gear.

2. In a clock mechanism, in combination with a visual time indicating means and strike means, a power means, differential mechanism operated by the power means, a gear associated with the differential mechanism for operating said visual time indicating means and a part of the strike means, a second gear associated with the differential mechanism and adapted to operate another part of the strike means, means to lock the second strike operating means against movement, and means operated to release the second strike operating means at stated intervals, whereby the second strike operating means comes into operation.

3. In a clock mechanism, time indicating means, a strike operating mechanism mounted for rotation, a common means for operating the time indicating means and the strike operating mechanism, the strike operating mechanism consisting of a ratchet wheel, a strike disc, a second strike disc and a count disc, and means for intermittently actuating the discs to rotate them.

4. In a clock mechanism, a power means, a rotatably mounted strike operating mechanism connected to the power means and adapted to be operated thereby at a uniform speed, a second means associated with the power means and engaging the strike operating mechanism adapted periodically to operate the strike operating mechanism at an increased speed.

5. In a clock mechanism, a power means, strike operating means consisting of a rotatably mounted shaft having a plurality of frictionally mounted discs thereon, means connected with the power means for rotating said shaft and the discs, means at all times in operative connection with the power means and operated thereby and in engagement with one of said discs to intermittently operate the discs at an increased speed.

6. In a clock mechanism, a ding bell and a dong bell, a continually rotating shaft, said shaft making one rotation in twelve hours, means frictionally mounted upon said shaft and adapted to rotate therewith to control the ringing of the bells, and means to speed the rotation of the last named means during the ringing of the bells and thereafter holding said means until the continually rotating shaft overtakes it in its rotation.

7. In a clock mechanism, a plurality of strike means, a rotatable shaft, means mounted upon said shaft for operating the strike means, including a ratchet disc and count discs, said count discs having projections on the periphery thereof, rotating means engaging the ratchet disc to rotate the strike means, means to lock the last named means against action, means to periodically release the locking means, a common means for operating the rotatable shaft and the means engaging the ratchet disc.

8. In a clock mechanism, time indicating means, a plurality of strike means, means for operating the strike means, a common source of power operating the time indicating means and the strike means, a plurality of connecting means between the source of power and the means for operating the strike means, one tending to continually operate the means for operating the strike means, another intermittently operating the means for operating the strike means, means for locking the intermittent means against action, and means controlled by the time indicating means to release the last named means.

JULIUS W. HANSEN.